(12) United States Patent
Syrivelis et al.

(10) Patent No.: US 12,445,270 B2
(45) Date of Patent: Oct. 14, 2025

(54) ON-DEMAND FORMATION OF SECURE USER DOMAINS

(71) Applicant: MELLANOX TECHNOLOGIES, LTD., Yokneam (IL)

(72) Inventors: Dimitrios Syrivelis, Volos (GR); Paraskevas Bakopoulos, Ilion (GR); Ioannis (Giannis) Patronas, Piraeus (GR); Elad Mentovich, Tel Aviv (IL)

(73) Assignee: MELLANOX TECHNOLOGIES, LTD. (IL)

( * ) Notice: Subject to any disclaimer, the term of this patent is extended or adjusted under 35 U.S.C. 154(b) by 686 days.

(21) Appl. No.: 17/683,972

(22) Filed: Mar. 1, 2022

(65) Prior Publication Data
US 2023/0269077 A1 Aug. 24, 2023

(30) Foreign Application Priority Data
Feb. 23, 2022 (GR) .............................. 20220100162

(51) Int. Cl.
H04L 9/40 (2022.01)
H04L 9/08 (2006.01)
H04L 9/32 (2006.01)

(52) U.S. Cl.
CPC .......... *H04L 9/0825* (2013.01); *H04L 9/0838* (2013.01); *H04L 9/0852* (2013.01); *H04L 9/3236* (2013.01)

(58) Field of Classification Search
CPC ... H04L 9/0825; H04L 9/0838; H04L 9/3236; H04L 9/088; H04L 63/0428; H04L 63/205
See application file for complete search history.

(56) References Cited

U.S. PATENT DOCUMENTS

| 11,347,870 | B2* | 5/2022 | Smith ................. H04L 63/0428 |
| 2009/0310783 | A1 | 12/2009 | Kokku et al. |
| 2012/0072716 | A1 | 3/2012 | Hu et al. |
| 2018/0341768 | A1* | 11/2018 | Marshall ................. G06F 21/53 |
| 2019/0228166 | A1 | 7/2019 | Smith et al. |
| 2020/0174949 | A1 | 6/2020 | Ramasamy et al. |
| 2022/0019667 | A1* | 1/2022 | Sood ....................... G06F 9/505 |
| 2022/0247554 | A1* | 8/2022 | Peddada ............... H04L 9/0897 |

FOREIGN PATENT DOCUMENTS

| CN | 113395248 | 9/2021 |
| CN | 114026834 | 2/2022 |

OTHER PUBLICATIONS

Official Action with Machine Translation for China Patent Application No. 202310120283.2, dated Aug. 23, 2025, 29 pages.

* cited by examiner

*Primary Examiner* — Thaddeus J Plecha
(74) *Attorney, Agent, or Firm* — Sheridan Ross P.C.

(57) ABSTRACT

Systems, data processing systems, and methods, among other things, are disclosed. An illustrative system includes an encryption orchestrator that analyzes a packet, obtains a tenant identifier (ID) from the packet, determines whether a tenant associated with the tenant ID currently has sufficient encryption credit available, and enables an encryption resource to process the packet using an encryption key associated with the tenant ID in response to determining that the tenant associated with the tenant ID currently has sufficient encryption credit available.

11 Claims, 6 Drawing Sheets

ON-DEMAND FORMATION OF SECURE USER DOMAINS

CROSS REFERENCE TO RELATED APPLICATION

This application claims the benefit of Greece Patent Application Serial No. 20220100162, filed Feb. 23, 2022, the disclosure of which is incorporated herein by reference in its entirety.

FIELD OF THE DISCLOSURE

The present disclosure is generally directed to systems, devices, and methods for encrypted data transfer.

BACKGROUND

Modern datacenters employ various devices and methods for high-speed data exchange that are vulnerable to malicious attacks, particularly when the data being exchanged is unencrypted.

BRIEF SUMMARY

In an illustrative embodiment, a system includes: an encryption orchestrator that analyzes a packet, obtains a tenant identifier (ID) from the packet, determines whether a tenant associated with the tenant ID currently has sufficient encryption credit available, and enables an encryption resource to process the packet using an encryption key associated with the tenant ID in response to determining that the tenant associated with the tenant ID currently has sufficient encryption credit available.

In an illustrative embodiment, a data processing system includes: an encryption orchestrator that enables a tenant in a plurality of tenants to deploy a confidentiality enclave specific to the tenant on computing resources shared among the plurality of tenants by: receiving a request to create the confidentiality enclave for the tenant; identifying a set of servers in a plurality of servers that include computing resources available to the tenant; employing a Root of Trust (RoT) on a first server in the set of servers to exchange an encryption key with every other server in the set of servers; updating data that associates a tenant identifier (ID) assigned to the tenant with the encryption key; and making the updated data available for reference during an encrypted transmission of data initiated by the tenant.

In an illustrative embodiment, a method of enabling a tenant in a plurality of tenants to deploy a confidentiality enclave specific to the tenant on computing resources shared among the plurality of tenants is provided where the method includes: receiving a request to create the confidentiality enclave for the tenant; identifying a set of servers in a plurality of servers that include computing resources available to the tenant; accessing a Root of Trust (RoT) on a first server in the set of servers to exchange an encryption key with at least a second server in the set of servers; updating data that associates a tenant identifier (ID) assigned to the tenant with the encryption key; and making the data available for reference during an encrypted transmission of data initiated by the tenant.

Additional features and advantages are described herein and will be apparent from the following Description and the figures.

BRIEF DESCRIPTION OF THE DRAWINGS

The present disclosure is described in conjunction with the appended figures, which are not necessarily drawn to scale.

DETAILED DESCRIPTION

Figure 1:
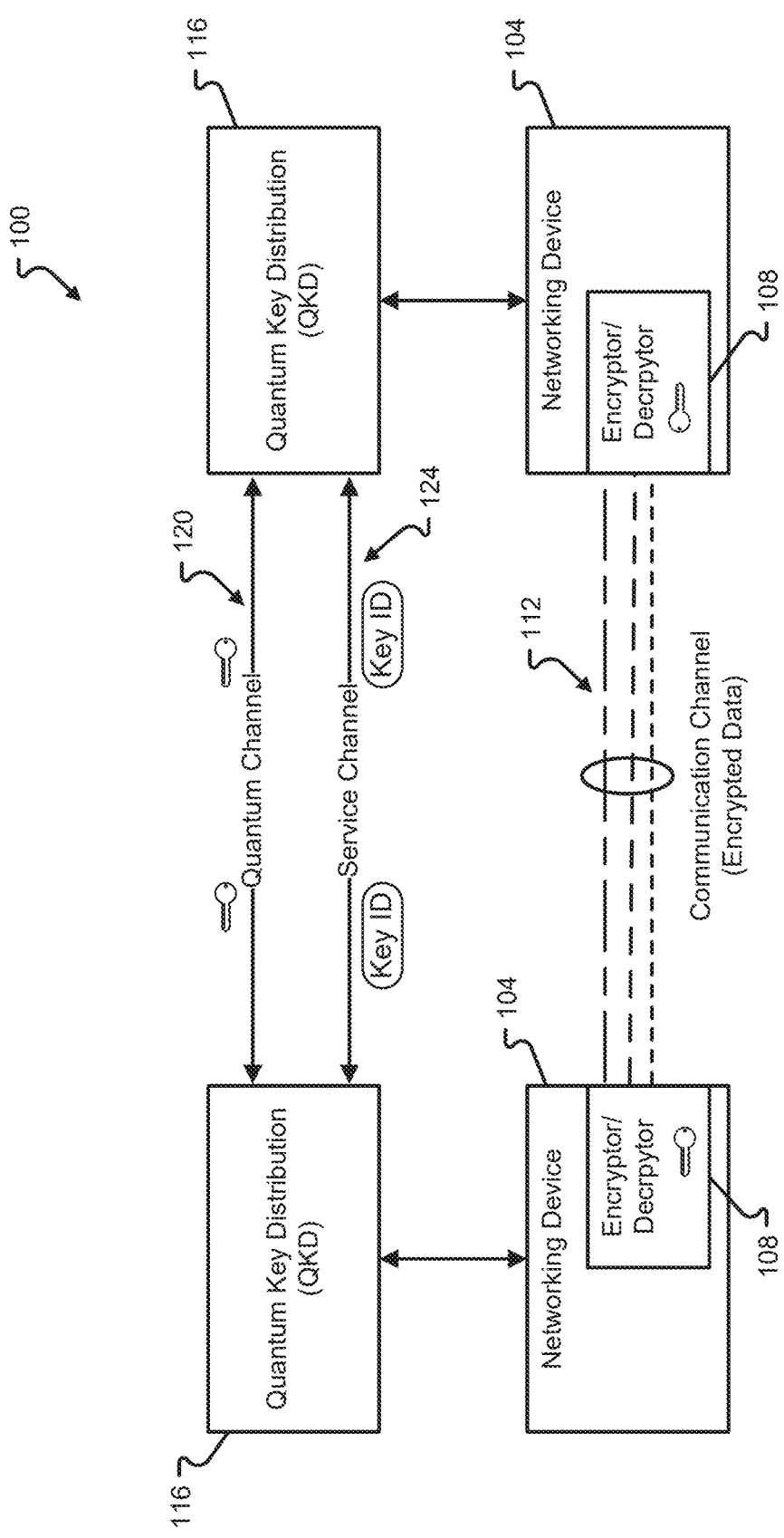
FIG. 1 illustrates a system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Encryption today is best when it is pervasive. Innovative adversarial attacks take place at all layers of the computer stack, and more recently even at the lowest level, the hardware resources. The aftermath of such attacks is that data should not reside or travel unencrypted in any hardware component, as attackers can even exploit performance monitoring methods to materialize side channels and eavesdrop on the data. Given the complexity of modern systems it is quite likely that data can be eavesdropped by adversaries. The sophistication of possible attacks makes it all the more important that data be in an encrypted, unusable state when it is illegally acquired.

Encrypting data when at-rest and in-motion states, and allowing only decryption immediately before the use state is the obvious way forward to secure complex hardware systems. Nevertheless, encryption at the individual resource level and key management on a per tenant basis, introduces a number of challenges which require innovative technical solutions.

One challenge to providing useful and secure hardware-level encryption is the efficiency. For example continuously encrypting and decrypting data as it transfers between data movement phases (e.g. system memory to the Network Interface Controller (NIC), NIC to the network, and NIC to system memory) cannot be considered efficient. It may be useful for the data to get encrypted immediately when it is no longer in use and get decrypted once immediately before it is to be used again. Encrypted main system memory is a good example of this approach. Data is encrypted during store operations and decrypted during load operations, so the contents of main system memory remain at all times encrypted. When moving memory data over the PCI-bus though, the memory data should get decrypted because target resources receiving the data for processing currently do not share a secret key with the memory controller.

The key sharing complexity scales as resources that are utilized in the same application context and belong to the same tenant span the server boundaries. Traditionally, the data movement between servers is secured by network-level security approaches that terminate encrypted tunnels at the early processing stages of the network stack. For network-level security tunnels, keys are exchanged with remote counterparts, using crypto algorithmic approaches like Diffie-Hellman. The fact that software is involved in the key exchange, introduces a similar vulnerability with regular data: keys are stored in main system memory unencrypted and can be therefore hijacked and render useless all the encryption support. With regards to network security there is an additional concern-part of the packet header should remain unencrypted because it is being used by network devices for forwarding operations (e.g., OSI L2 switching and L3 routing). Eavesdroppers can, therefore, learn the network identifiers of the tunnel end points and attempt a variety of network-level attacks.

Embodiments of the present disclosure provide an approach that allows datacenter orchestration software to materialize on-demand, per-tenant resource enclaves that implement a confidentiality scheme spanning server boundaries. The proposed approach is based on a secure secret key distribution scheme that leverages an out-of-band key exchange secure channel and uses a Serializer/Deserializer (SERDES) datalink layer to coordinate key management and deliver the key among all components that the tenant will be using across all the servers where they belong. Subsequently, encryption and decryption operations are assigned to components that implement transitions from data-in-use to data-at-rest or data-in-motion only. For network facing transfers, the datalink layer encryption scheme can be extended to work with any Media Access Control (MAC) protocol that implements frame transfers.

An aspect of the present disclosure is to encrypt some or all network headers that travel on the wire, which will prohibit or frustrate the adversary from figuring out where encrypted traffic is coming from and where it is heading.

Another aspect of the present disclosure is to provide a confidentiality scheme that allows a tenant to create a resource enclave that spans server boundaries. An encryption orchestrator is described that is configured to secure all data movement transfers, inside and outside the server with the same tenant-owned key. The data cannot be eavesdropped unencrypted at any stage as the data will be only decrypted immediately before use and not during storage or transfers.

Additionally, key distribution is materialized as a Root of Trust (RoT) functionality, and isolated from software. Tenants are not aware of the keys that are used to secure their deployment. Secure key sharing schemes that coordinates key installation over the low-level datalink layer may then be used. Furthermore, datalink layer encryption is proposed that can be used to encrypt the network headers for point-to-point transfers (e.g., between NICs and switch ports). The proposed encryption approach may be considered complementary to higher-level encryption schemes like MACsec and IPsec.

Embodiments of the present disclosure also provide an on-demand bring up of a security enclave on shared resources that orchestrates the aforementioned functionalities so that tenant workloads may run on a fully encrypted setup.

It may also be possible to provide accounting capabilities that enable the provision of the encryption service as a pay-as-you go feature.

Low-level encryption support that protects data when executed on resources that are inside a server, is emerging. A concern of introducing encryption everywhere, is the required additional encryption logic for each component, the latency penalty of in-band encryption for data in-motion, the overall power consumption penalty and, last but not least, the secret key sharing.

Embodiments of the present disclosure provide the ability for tenants to deploy a confidentiality enclave on the resources that their workload will be using, regardless of whether or not the resources are shared with other tenants and/or span the server boundaries.

An encryption orchestrator is proposed that receives the request to create a secure enclave and the resource list. Subsequently a selected RoT leverages out-of-band key exchange support to exchange keys with all the remote servers RoT that contain involved resources.

In some embodiments, a tenant workload identifier is subsequently generated by the designated RoT and is distributed among all the entities using the key exchange mechanism. The workload identifier can then be pushed to all resources and an association can be established between the key identifier and the data processing identifier. This approach may enable each resource component to identify which data belongs to which tenant and also retrieve the right key to perform encrypt/decrypt operations. For example, in system memory encryption, the workload identifier may be uniquely associated in a memory controller internal table with a key identifier and the Operating System (O/S) process identifier that belongs to the tenant at the host side. Each time an access to the process memory address space happens, the associated workload identifier can be used to retrieve the key identifier and subsequently encryption/decryption can be carried out. In some embodiments, the workload identifier cannot coincide with the key identifier, as the runtime re-keying is also supported and the secret key can be updated several times throughout the lifetime of the workload. As another example, the Peripheral Component Interconnect express (PCIe) bus Root Complex (RC) or host bridge, receives an access that is associated with specific application context (e.g., ACTag) that is aimed at a specific peripheral. The payload is already encrypted, but the PCI header that includes information like payload size, physical address, and application context identifier should be unencrypted. The PCIe support can use the key that is provided by the RoT to encrypt the PCIe header for transfers between the links and decrypt on the other side upon reception (the header only) so forwarding can work. In the same spirit each resource stage encrypts and decrypts locally only the portion of the data that is required.

Embodiments of the present disclosure may also relate to Quantum Key Distribution (QKD) devices and systems implementing the same. QKD equipment is commercially available and is finding application in use cases where particular point-to-point links need to be secured, such as in inter-datacenter connections. The hardware essence of QKD requires changes to the overall network design and infrastructure. Typically, QKD equipment is added alongside existing network equipment to facilitate key exchange in select connections which are considered non-trusted.

The above-described systems, methods, and devices will now be explained with reference to FIGS. 1-6.

FIG. 1 illustrates a possible system 100 configuration in which QKD devices 116 are deployed alongside networking devices 104. A QKD secured link or encrypted communication channel 112 connects two networking devices 104. Examples of networking devices 104 include, without limitation, edge routers, switches, NICs, Top of Rack (ToR) switches, servers, server blades, etc. Each networking device 104 can have encryption capabilities, via an encryptor/decryptor 108, for particular ports (typically hardware accelerated to achieve high line speeds) or, alternatively, can be connected to a dedicated device serving as an encryptor for each port. Encrypted data is exchanged through the communication channel 112 directly connecting the two networking devices 104.

The encryptor/decryptor 108 of each networking device 104 utilizes QKD keys that have been exchanged via the QKD devices 116. The encryptor/decryptor 108 may include suitable hardware and/or software for encrypting data and storing the encrypted data on encrypted memory. The encryptor/decryptor 108 may further include suitable hardware and/or software for decrypting the data from encrypted memory. The encryptor/decryptor 108 may encrypt data from one or more Central Processing Units (CPUs) using a key received from a local RoT over an isolated (secure) channel established with the QKD device 116. The encryptor/decryptor 108 may include encrypted memory in the form of volatile and/or non-volatile storage devices. Non-limiting examples of suitable memory devices for the encrypted memory include flash memory, Random Access Memory (RAM), variants thereof, combinations thereof, or the like. The encrypted memory may be main system memory of the networking device 104, peripheral device dedicated memory (e.g., Graphics Processing Unit (GPU) memory), encrypted storage (e.g., NVMe Over Fabric), and/or storage class memory.

The QKD keys are exchanged directly from the QKD devices 116 through a quantum channel 120. An additional service channel 124 between the QKD devices 116 may be used to facilitate the implementation of the QKD protocol. The service channel 124 may be used by the QKD devices 116 to exchange information about key identifiers and does not carry the actual keys. Therefore, any information exchanged via the service channel 124 will not necessarily compromise the system's 100 security.

Each networking device 104 may be connected to a QKD device 116 through a physical link. An illustrative, but non-limiting example of a physical link that may be used to couple a QKD device 116 to a networking device 104 is a 1 GbE LAN port. Communication between the QKD device 116 and the networking device 104 aims to provide the QKD keys and key IDs to the networking device 104 and is typically implemented according to existing standards such as the ETSI014. In this standard the QKD device 116 exposes an https server from whom the networking device 104 queries the key IDs. The QKD device 116 and the networking device 104 are located on the same site, which is considered a secure domain; therefore, the link between them does not introduce security vulnerabilities.

While illustrated and described as a network element, it should be appreciated that the networking device 104 may correspond to any type of device that becomes part of or is connected with a communication network. Other examples of suitable devices that may act or operate like a networking device 104 as described herein include, without limitation, one or more of a Personal Computer (PC), a laptop, a tablet, a smartphone, a server, a collection of servers, or the like.

The communication channel 112 is described as traversing a datacenter, but it should be appreciated that the communication channel 112 may traverse any type of communication network (whether trusted or untrusted). Examples of a communication network that may be used to connect networking devices 104 and support the communication channel 112 include, without limitation, an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network enables data transmission between the networking devices 104 using optical signals. In this case, the networking devices 104 and the communication network may include waveguides (e.g., optical fibers) that carry the optical signals. In one specific, but non-limiting example, the communication network enables data transmission between the networking devices 104 using electrical signals. In this case, the networking devices 104 and the communication network may include conductive wires (e.g., copper wires) that carry the electrical signals. In one embodiment, the communication network enables data transmission with both electrical and optical signals.

Figure 2:
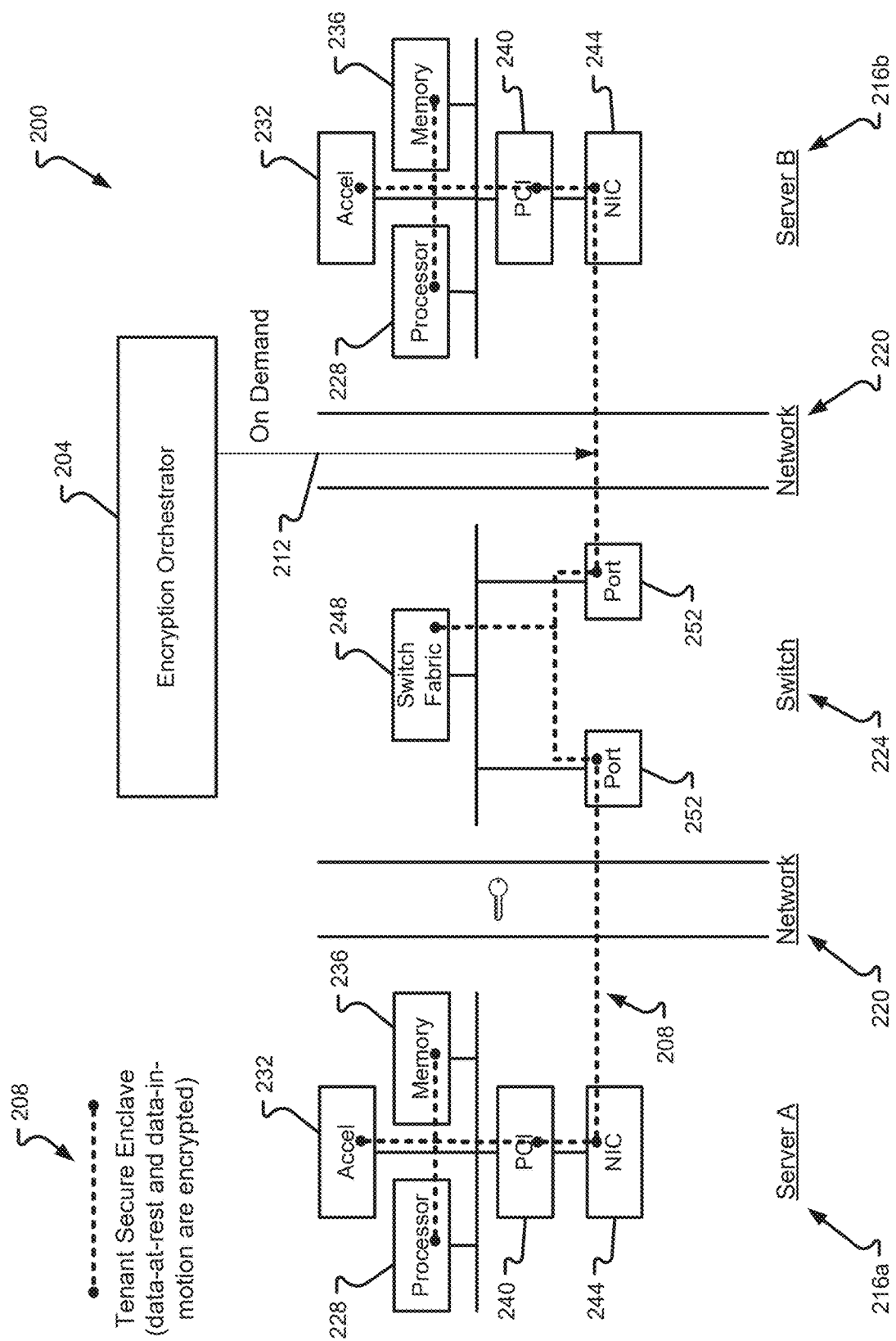
FIG. 2 illustrates additional details of a system according to at least one example embodiment.
Figure 3:
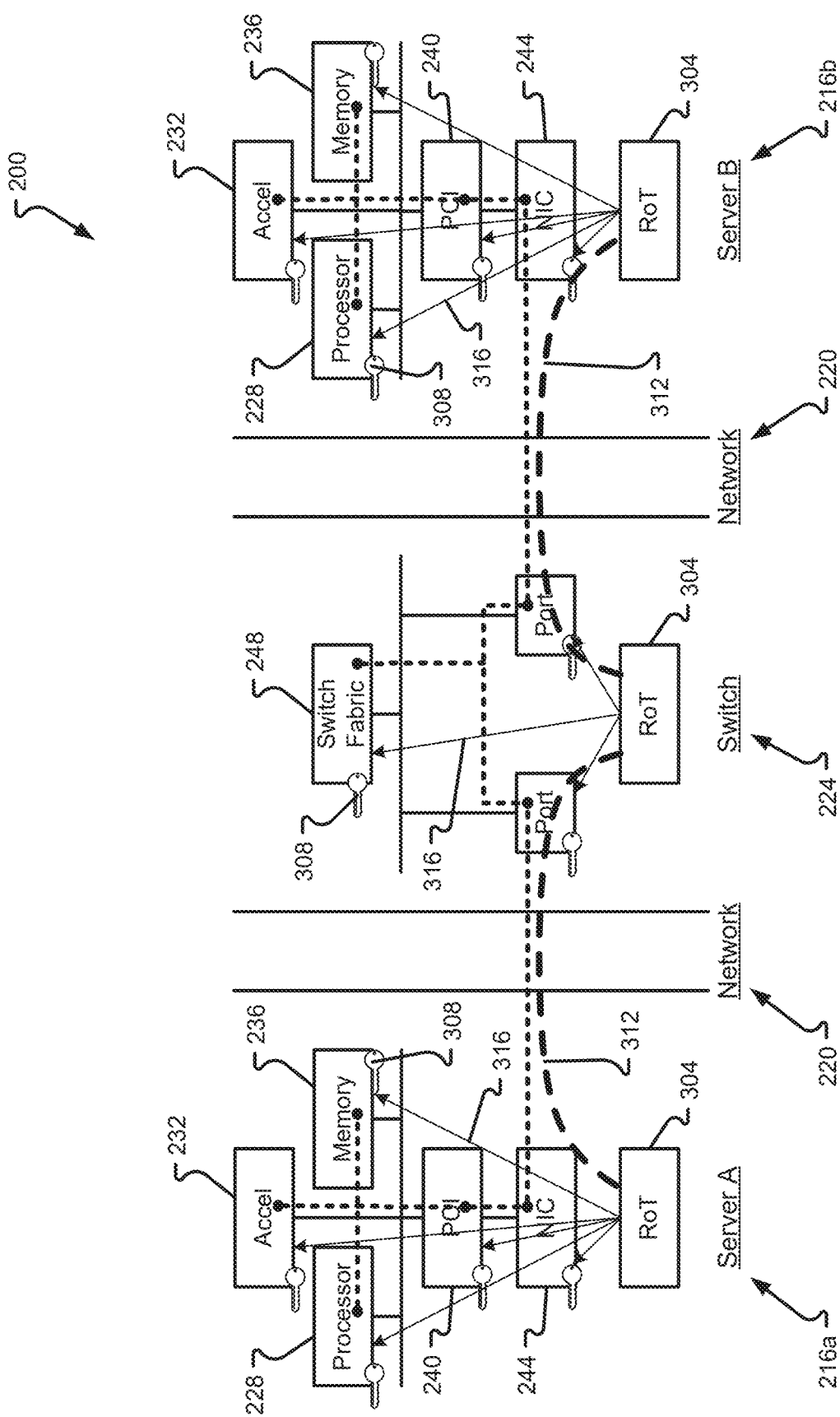
FIG. 3 illustrates further details of a system according to at least one example embodiment.

With reference now to FIGS. 2 and 3, additional details of a system 200 that facilitates secure data maintenance and transfers will be described. Various configurations of a system 200 are shown and should not be construed as limiting embodiments of the present disclosure.

FIG. 2 illustrates a system 200 in which an encryption orchestrator 204 is managing the secured communications between servers and switches. Specifically, but without limitation, the system 200 is shown to include an encryption orchestrator 204 is connected to a network 220 that also connects a first server 216a with a second server 216b via a switch 224. Both servers 216a, 216b are shown to include a processor 228, an accelerator 232, memory 236, a PCI 240, and a NIC 244. The NIC 244 of each server 216a, 216b may provide connectivity between the server 216a, 216b and a network 220. The network 220 may provide connectivity between the servers 216a, 216b and the switch 224.

The switch 224 is shown to include a switching fabric 248 in communication with a plurality of communication ports 252. Data flowing from one server (e.g., the first server 216a) to another server (e.g., the second server 216b) through the switch 224 may be secured in a tenant secure enclave 208. The tenant secure enclave 208 may be managed by the encryption orchestrator 204 via an on-demand security channel 212.

As will be described in further detail herein, the encryption orchestrator 204 may reside on one or many components of the system 200 to manage the tenant secure enclave 208. As an example, the encryption orchestrator 204 may be provided in software, firmware, and/or hardware of a server 216a, 216b and/or switch 224. It may also be possible to provide the encryption orchestrator 204 at a centralized controller. In some embodiments, the encryption orchestrator 204 is provided on one or many of the networking devices 104 being used by a tenant as part of their workflow.

The encryption orchestrator 204 may be configured to hold resource identifiers and relevant configuration details with regards to which data will get encrypted and for which tenant. For that reason the encryption orchestrator 204 can generate a workload identifier and communicate with the RoT devices of every server 216a, 216b that contains resources (e.g., processor 228, accelerator 232, memory 236, PCI 240, NIC 244) that will be used for the workload execution. Each resource features an encryption and decryption component that implements a cipher. Each resource encryptor may be provided with isolated access to a lookup table that associates a workload identifier with a secret key label and another resource specific identifier (e.g., a memory address, a tag, an IP port, etc.) that will allow the discrimination of tenant traffic. Subsequently, the encryptor can perform per-tenant encryption, that happens only if the encryption orchestrator 204 has enabled encryption in the resource. In addition the encryption orchestrator 204 can dictate partial encryption of the tenant data that covers, for example, the annotation data that need to be used by a particular resource (e.g., a memory address, an interrupt identifier, etc.) for processing/forwarding rather than the whole data handled. This way each resource can flexibly encrypt a portion of the data that it needs to receive encrypted (or data it needs to append for internal use) and is important to local handling, rather than the rest of the data that has been previously encrypted.

As a non-limiting example of the above-described functionality, assume an encrypted memory controller receives a memory read request by a Direct Memory Access (DMA) engine over the PCI 240 bus. The memory controller needs to be able to read the memory address of the request and the requested size of data, therefore the PCI Root Complex can decrypt the read request header before delivering it to the memory controller. The memory controller will read the in-memory encrypted data and deliver the response to the PCI Root Complex (RC) so the data can be returned to the remote DMA engine. The response header will be passed to the PCI-RC unencrypted because the PCI-RC needs to figure out for which component this response is, the response data though will be delivered to the PCI-RC encrypted. Subsequently, the PCI-RC will encrypt the response header towards the destination endpoint, so if an adversary eavesdrops the PCI lanes, the adversary cannot figure out anything regarding the transaction as every bit on the wire will be encrypted.

Once the aforementioned configurations are pushed to each involved resource, a secure tenant resource enclave is brought up, as depicted in FIG. 2. Each resource will contribute to the confidential handling of the tenant data, which will nowhere rest decrypted, thus forming a virtual shared resource enclave 208. Notably, the same physical resources may be shared between different tenants, but different keys per tenant will be used. In addition to securing the resources of the servers 216a, 216b, it may also be possible to secure resources (e.g., the switch fabric 248 and/or ports 252) of the switch 224. Thus, the entirety of the tenant secure enclave 208 is maintained in a secure state.

As shown in FIG. 3, the per tenant secret key 308 provisioning can take place in isolation and may be a RoT 304 components functionality. The secret key(s) 308 may be delivered 316 when the encryption orchestrator 204 request ends up triggering appropriate firmware callbacks. A designated RoT 304 is considered the master RoT 304 that generates the key(s) 308 and subsequently distributes the key(s) 308 to the neighbor RoTs 304 on the same and neighbor servers 216a, 216b. In the illustrated example, a key exchange channel 312 is established between RoTs 304 of different networking devices 104 (e.g., the switch 224 and servers 216a, 216b). As noted above, the key exchange channel 312 may include a quantum channel 120 and/or service channel 124.

In some embodiments, the RoT 304 delivers keys 308 to components via isolated channels 312 that are not exposed to software. The network facing key exchange may leverage an out-of-band mechanism (e.g., the quantum channel 120). QKD approaches provide an appropriate approach, but other non-quantum approaches may also be considered. For instance, traditional key-exchange protocols may also be used to distribute keys 308 between the RoTs 304 of different networking devices 104. Embodiments of the present disclosure contemplate that RoT devices 304 provide the keys 308 in a confidential manner as described above.

Figure 4:
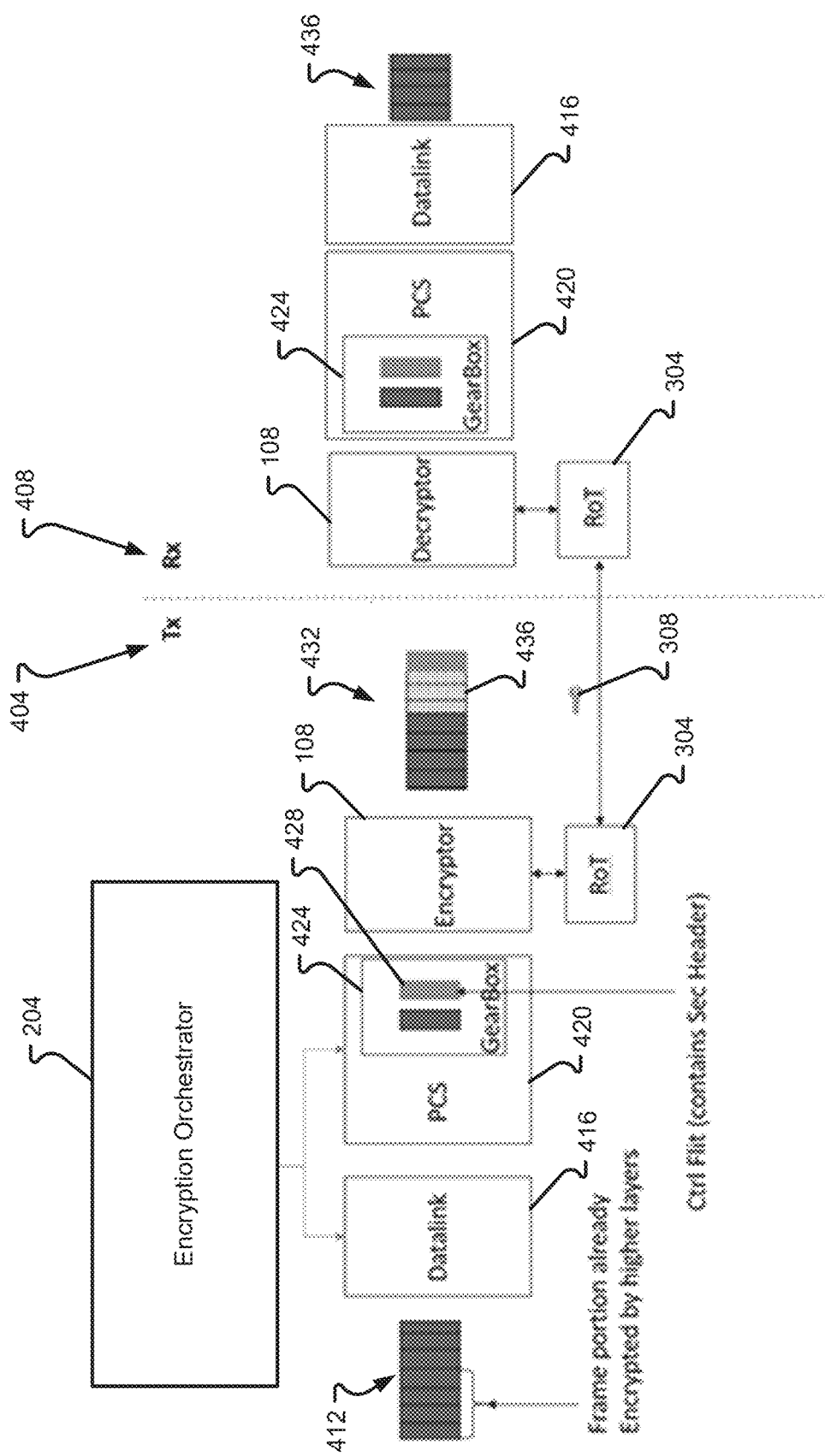
FIG. 4 is a block diagram illustrating a datalink layer encryption scheme with key provisioning according to at least one example embodiment.

With reference now to FIG. 4, additional details related to operations of the encryption orchestrator 204 will be described in accordance with at least some embodiments of the present disclosure. Embodiments of the present disclosure provide an approach whereby encryption support is provided on a datalink layer (e.g., on a SERDES channel).

FIG. 4 illustrates a transmitter 404 and a receiver 408 in communication with one another. The transmitter 404 may correspond to a first networking device 104 and the receiver 408 may correspond to a second networking device 108.

The transmitter 404 is shown to include the encryption orchestrator 204, though it should be appreciated that the encryption orchestrator 204 may be provided on the receiver 408 or at some other device in the system 200. The transmitter 404 is also shown to include a datalink 416, a Physical Coding Sublayer (PCS) 420, an encryptor 108, and a RoT 304. The PCS 420 is shown to include a gearbox 424. The receiver 408 includes a corresponding RoT 304, decryptor 108, PCS 420, and datalink 416.

As SERDES underpins most interconnects for chip-to-chip data transfers, the proposed encryption scheme is applicable for all data-in-motion security. Notably, SERDES-based communication is implemented between components on the same server but also between NIC and Switch ports, so the approach is applicable also to network data transfers.

After physical layer digital signal processing, the SERDES stack features some hardware logic layers that are implemented with RTL, before the data are recovered at the receive 408 and can be further handled by at the transaction layer. These low-level layers are bundled under the datalink 416 layer and are typically named PCS 420 and Physical Medium Attachment (PMA). The PCS 420 layer is of interest, as it is the lowest layer that groups data bits in entities that are well defined and can be individually handled. These entity is called flit, its bit size is defined by the SERDES logic design, and is typically the group of bits that can be individually handled within a clock cycle by a hardware pipeline stage. So a chunk of data that is pushed from one resource to the next via SERDES is chopped in flits within the SERDES hardware pipeline for forwarding. The PCS 420 layer features the gearbox 428, and can designate different portions or bits contained within a tenant frame 412 received at the datalink 416 layer. Specifically, the gearbox 424 may be configured to designate between data and control flits 428. The data flits carry the payload of the tenant frame 412 whereas the control flit 428 is used to pass control messages between the SERDES endpoints and is consumed between the SERDES endpoints. For example, one functionality of the control flit 428 is the clock compensation message and another the Cyclic Redundancy Check (CRC) check sequence message.

Embodiments of the present disclosure introduce encryption support via the encryption orchestrator 204 at the SERDES level. Specifically, a control message may be designated to carry a key label and also identify the number of the follow-up flits that are encrypted with the secret key 308 corresponding to a particular label. When a tenant frame 412 reaches the datalink 416 layer of the SERDES channel, a special annotation that contains the workload identifier follows the flit as it enters the SERDES pipeline. After the gearbox 424, an encryptor 108 module is receiving the control flit 428. Before the control flit 428 gets forwarded as part of an encrypted tenant frame 432, the encryptor 108 retrieves an appropriate encryption key 308 based on the label and encrypts the flits 436 that follow according to instructions on the control flit 428. Subsequently the control flit 428 is sent unencrypted to the receiver so a decryptor 108 can perform the inverse procedure, decrypting only the number of designated flits 436. The design assumes that a block cipher is used that does not expand the 432 data and operates on flit-sized blocks (e.g., the flit size is fixed). For example AES cipher meets these requirements, but details of the ciphers will not be described for ease of discussion. An appropriately designed SERDES channel at the receiver will be capable of decrypting the encrypted tenant frame 432 and producing a decrypted tenant frame 436, which should substantially match the tenant frame 412. Meanwhile, an attacker or adversary will have little to no insight about the architecture established by the tenant within the tenant secure enclave 208.

Given this support, if an eavesdropper taps the SERDES channel, all the data flits 436 will be encrypted in the encrypted tenant frame 432 except for the control flits 428. In case the SERDES encryption support is configured to just encrypt a portion of the data, it is assumed that the rest of the data is already encrypted previously as for instance it would happen if the user frame was an IPSec packet. The amount of flits 436 to be encrypted is configurable and for performance reasons, encryption may happen only for a portion of data that is unencrypted.

Referring back to the IPsec example, without the disclosure encryption scheme support, tapping the SERDES lanes between the NIC and the switch port would allow the adversary to see the MAC header and the IP header of each flow. This information enables the adversary to understand to which domain and/or service the flow belongs and decide if it is of interest or not. The eavesdropped flow packets could be then stored by the adversary in permanent storage and attempt a brute force attack to decrypt the information of the payloads offline. In the post quantum era, breaking data at rest that have been illegally acquired is a very realistic threat. With the proposed SERDES encryption scheme, the eavesdropper will have zero insight to whom the data belongs. While the classification of flows per tenant will be feasible, one would have to decipher all flows anyway to find the tenant that is of interest as IP and Ethernet headers will be encrypted. This significantly scales the problem space for an attacker.

Figure 5:
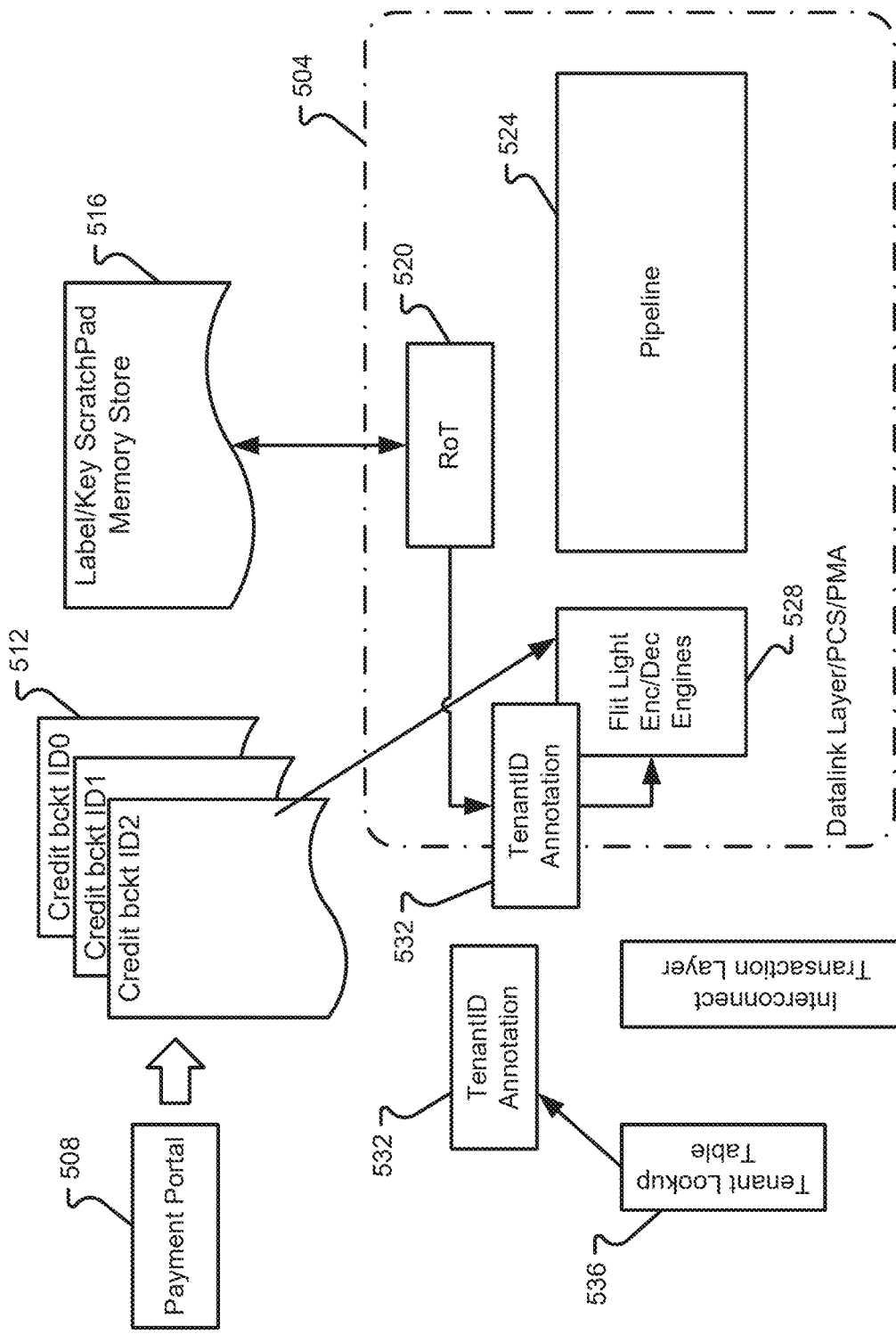
FIG. 5 is a block diagram illustrating tenant provisioning capabilities according to at least one example embodiment.

As shown in FIG. 5, the ability to discriminate which traffic belongs to which tenant further enables the introduction of accounting support, that allows a datacenter provider to offer SERDES-level encryption as a pay-as-you-go service. The pay-as-you-go functionality may be provided as part of the encryption orchestrator 204 logic, which manages credit buckets 512. In some embodiments, the credit buckets 512 may be implemented as counters that are associated with each tenant flow. Each time a flit is forwarded and encrypted under control of the encryption orchestrator 204, the respective counter is decremented for the tenant. If a counter becomes zero, the associated tenant flow stops getting encrypted until additional credits are purchased. The encryption orchestration is responsible to keep the counters updated and appropriately managed based on data flows, encryptions, and additions to the credit buckets 512.

In some embodiments, the encryption orchestrator 204 may obtain a tenant ID from a flit of the packet (e.g., from the tenant frame 412). The encryption orchestrator 204 may reference the tenant lookup table 536 to identify an appropriate tenantID annotation 532. The tenantID annotation 532 may be appended to a received packet or frame 412 (e.g., as part of a control flit 428) before the flits are sent to the datalink layer 504, which may include the SERDES pipeline 524 as described above. The datalink layer 504 may also include a RoT 520 (which may be similar or identical to the RoT 304) and a flit encryption/decryption engine 528. The flit encryption/decryption engine 528 may include the encryptor/decryptor 108.

In some embodiments, a tenant may be provided access to a payment portal 508, which allows the tenant to refill or define rules for refilling the tenant's credit bucket 512. The encryption/decryption capabilities of the flit encryption/decryption engine 528 may only be enabled in situations where a valid tenantID annotation is appended to a flit 532 and the encryption orchestrator 204 has determined that the associated tenant has sufficient encryption credits in their credit bucket 512.

In some embodiments, the RoT 520 may reference a label/key that is stored in RoT-internal memory (also known as scratchpad memory) store 516 for purposes of determining whether a valid tenantID annotation should be maintained for a tenant or whether the tenantID should be removed. This approach enables to RoT to implement a tenant expiration scheme and also garbage-collect any no longer used entries.

Figure 6:
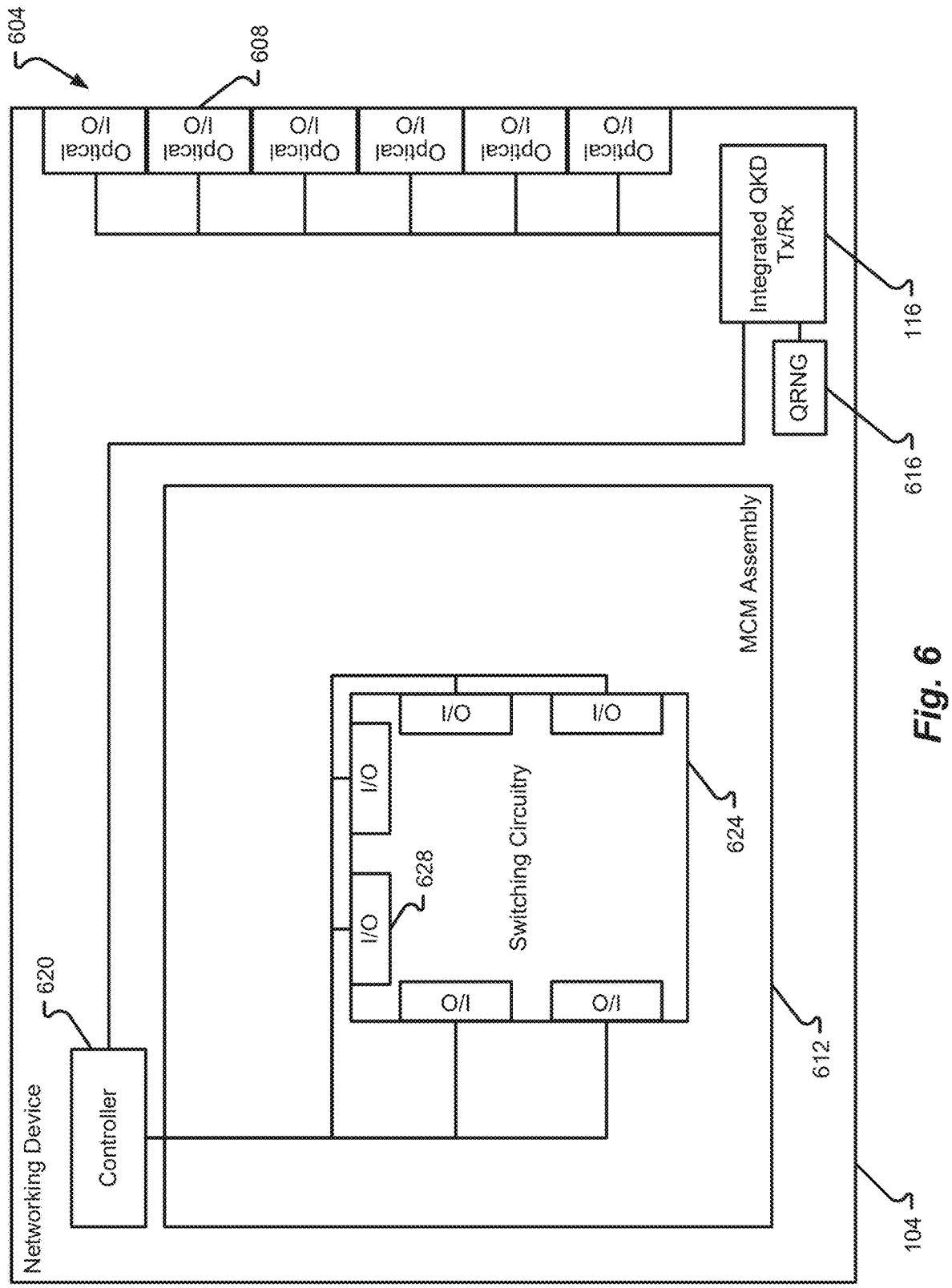
FIG. 6 is a block diagram illustrating details of a networking device according to at least one example embodiment.

Miniaturized QKD systems are becoming available. With reference now to FIG. 6, additional details of a networking device 104 that may include a QKD device 116 for purposes of implementing an encryption orchestrator 204 will be described in accordance with at least some embodiments of the present disclosure. The feasibility of integrating a Quantum Random Number Generator (QRNG) 616 in a pluggable form is also contemplated. In some embodiments, the networking device 104 may be configured to include or interact with pluggable QKD devices 116, which may be connected to a front panel 604 of the networking device 104. In this way, the QKD device along with the QRNG 616 may represent a QKD system that is integrated (partially or completely) on the networking device 104. It may be desirable to expose a portion of the QKD system (e.g., the QKD device 116) at the front panel 204 of the networking device 104 for space management, among other things. Such a concept would fit nicely to a networking device 104 (e.g. an edge router) as such devices provide available space on their front panel 604 to add extra pluggable transceiver ports 608.

As can be appreciated, various design considerations may be used in connection with different networking devices 104. In some embodiments, the encryption orchestrator 204 may be provided within a controller 620 of the networking device 104 and/or as part of the QKD device 116 itself. In some embodiments, the networking device 108 includes a level of integration of QKD functionality in co-packaged datacenter switches or the like.

Co-packaging may refer to the close integration of different electrical and/or optoelectronic chips in the same package. The different chips that constitute the co-packaged system are assembled on a single substrate in what is typically called a multi-chip module (MCM) assembly 612. The MCM assembly 612 can include switching circuitry 624 surrounded by peripheral chips. In some embodiments, the switching circuitry 624 and surrounding chips are all mounted on a common substrate, although such a configuration is not required. The MCM assembly 6247 may be provided in a larger housing of the networking device 104, positioned behind the front panel 604. The switching circuitry 624 may include one or more core digital Application Specific Integrated Circuits (ASICs), CPUs, GPUs, microprocessors, FPGAs, combinations thereof, and the like.

In a non-limiting example, the co-packaged networking device 104 may be provided as a switch enclosure that is, for instance, a rackmount unit. The networking device 104 may include the MCM assembly 612, optical transceiver ports 608, a QKD device 116, a QRNG 616, and a controller 620.

As discussed above, optical transceiver ports 608 are placed at the front panel 604. The ports 608 may be transferred to the front panel 604 through fibers. The controller 620 is shown to facilitate communications between the QKD device 116 and components of the MCM assembly 624. The controller 620 may include one or more of a processor, microcontroller, or dedicated, bespoke ASIC (e.g., a particular type of microcontroller or μC).

In some embodiments, the QRNG 616 may be provided as a chip that can communicate with the QKD device 116 as well as with the MCM assembly 624 through a serial interface, providing truly random numbers to facilitate secure encrypted communications over a communication channel 112. It should be appreciated that the QRNG 616 may be provided in a pluggable form similar to the QKD device 116. Alternatively, one or both devices may be integrated in the networking device 104 as shown in FIG. 6.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured as follows:

(1) A system, comprising:
    an encryption orchestrator that analyzes a packet, obtains a tenant identifier (ID) from the packet, determines whether a tenant associated with the tenant ID currently has sufficient encryption credit available, and enables an encryption resource to process the packet using an encryption key associated with the tenant ID in response to determining that the tenant associated with the tenant ID currently has sufficient encryption credit available.

(2) The system of (1), wherein the encryption key comprises a quantum key and wherein the quantum key is singularly associated with the tenant.

(3) The system of (1) or (2), wherein the encryption orchestrator obtains the tenant ID from a flit of the packet.

(4) The system of (3), wherein the flit comprises a first flit of the packet.

(5) The system of (1)-(4), wherein the encryption resource comprises a physical coding sublayer (PCS) hardware resource.

(6) The system of (5), wherein the PCS hardware resource comprises at least one of transmitting circuitry, scrambling circuitry, a gearbox, and encoding circuitry.

(7) The system of (5), wherein the PCS hardware resource provides an encrypted version of the packet to a Serializer/Deserializer (Serdes).

(8) The system of (1)-(7), wherein the packet is received from circuitry operating at a data link layer.

(9) The system of (1)-(8), wherein the encryption orchestrator updates a number of encryption credits available to the tenant after enabling the encryption resource to encrypt the packet with the encryption key.

(10) The system of (1)-(9), wherein the encryption orchestrator determines whether the tenant associated with the tenant ID current has sufficient encryption credit available by referencing a listing of resources.

(11) A data processing system, comprising:
an encryption orchestrator that enables a tenant in a plurality of tenants to deploy a confidentiality enclave specific to the tenant on computing resources shared among the plurality of tenants by:
receiving a request to create the confidentiality enclave for the tenant;
identifying a set of servers in a plurality of servers that include computing resources available to the tenant;
employing a Root of Trust (RoT) on a first server in the set of servers to exchange an encryption key with every other server in the set of servers;
updating data that associates a tenant identifier (ID) assigned to the tenant with the encryption key; and
making the updated data available for reference during an encrypted transmission of data initiated by the tenant.

(12) The data processing system of (11), wherein each server in the set of servers comprises a RoT and wherein the RoT on the first server exchanges the encryption key with the RoT on every other server in the set of servers.

(13) The data processing system of (12), wherein the encryption key is exchanged using an out-of-band key exchange process.

(14) The data processing system of (13), wherein the encryption key comprises a quantum key and wherein the out-of-band key exchange process employs a Quantum Key Distribution (QKD) device.

(15) The data processing system of (11)-(14), wherein the encryption orchestrator further enables a second tenant in the plurality of tenants to deploy a second confidentiality enclave specific to the second tenant on one or more computing resources in the computing resources having the confidentiality enclave of the tenant deployed thereon.

(16) The data processing system of (11)-(15), wherein the computing resources comprise cloud computing resources and wherein the encryption key is used to encrypt or decrypt one or more data packets exchanged during a memory access within the computing resources.

(17) A method of enabling a tenant in a plurality of tenants to deploy a confidentiality enclave specific to the tenant on computing resources shared among the plurality of tenants, the method comprising:
receiving a request to create the confidentiality enclave for the tenant;
identifying a set of servers in a plurality of servers that include computing resources available to the tenant;
accessing a Root of Trust (RoT) on a first server in the set of servers to exchange an encryption key with at least a second server in the set of servers;
updating data that associates a tenant identifier (ID) assigned to the tenant with the encryption key; and
making the data available for reference during an encrypted transmission of data initiated by the tenant.

(18) The method of (17), wherein the data comprises a listing of resources, the method further comprising:
analyzing a packet received at physical coding sublayer (PCS) hardware resources of a server in the set of servers;
referencing the listing of resources to determine whether the tenant associated with the tenant ID currently has sufficient encryption credit available; and
enabling the PCS hardware resources to process the packet using the encryption key in response to determining that the tenant associated with the tenant ID currently has sufficient encryption credit available.

(19) The method of (17) or (18), wherein each server in the set of servers comprises a RoT, wherein the RoT on the first server exchanges the encryption key with the RoT on every other server in the set of servers, wherein the encryption key comprises a quantum key, and wherein a Quantum Key Distribution (QKD) device is used to exchange the quantum key.

(20) The method of (17)-(19), wherein the computing resources comprise cloud computing resources and wherein the encryption key is used to encrypt or decrypt one or more data packets exchanged during a memory access within the computing resources.

(21) The method of (17)-(20), further comprising:
updating a number of encryption credits available to the tenant after encrypting a packet with the encryption key.

What is claimed is:

1. A data processing system, comprising:
an encryption orchestrator that enables a tenant in a plurality of tenants to deploy a confidentiality enclave specific to the tenant on computing resources shared among the plurality of tenants by:
receiving a request to create the confidentiality enclave for the tenant;
identifying a set of servers in a plurality of servers that include computing resources available to the tenant;
employing a Root of Trust (RoT) on a first server in the set of servers to exchange an encryption key with every other server in the set of servers;
updating data that associates a tenant identifier (ID) assigned to the tenant with the encryption key; and
making the updated data available for reference during an encrypted transmission of data initiated by the tenant.

2. The data processing system of claim 1, wherein each server in the set of servers comprises a RoT and wherein the RoT on the first server exchanges the encryption key with the RoT on every other server in the set of servers.

3. The data processing system of claim 2, wherein the encryption key is exchanged using an out-of-band key exchange process.

4. The data processing system of claim 3, wherein the encryption key comprises a quantum key and wherein the out-of-band key exchange process employs a Quantum Key Distribution (QKD) device.

5. The data processing system of claim 1, wherein the encryption orchestrator further enables a second tenant in the plurality of tenants to deploy a second confidentiality enclave specific to the second tenant on one or more computing resources in the computing resources shared among the plurality of tenants.

6. The data processing system of claim 1, wherein the computing resources shared among the plurality of tenants comprise cloud computing resources and wherein the encryption key is used to encrypt or decrypt one or more data packets exchanged during a memory access.

7. A method of enabling a tenant in a plurality of tenants to deploy a confidentiality enclave specific to the tenant on computing resources shared among the plurality of tenants, the method comprising:

receiving a request to create the confidentiality enclave for the tenant;

identifying a set of servers in a plurality of servers that include computing resources available to the tenant;

accessing a Root of Trust (RoT) on a first server in the set of servers to exchange an encryption key with at least a second server in the set of servers;

updating data that associates a tenant identifier (ID) assigned to the tenant with the encryption key; and making the data available for reference during an encrypted transmission of data initiated by the tenant.

8. The method of claim 7, wherein the data comprises a listing of resources, the method further comprising:

analyzing a packet received at physical coding sublayer (PCS) hardware resources of a server in the set of servers;

referencing the listing of resources to determine whether the tenant associated with the tenant ID currently has sufficient encryption credit available; and enabling the PCS hardware resources to process the packet using the encryption key in response to determining that the tenant associated with the tenant ID currently has sufficient encryption credit available.

9. The method of claim 7, wherein each server in the set of servers comprises a RoT, wherein the RoT on the first server exchanges the encryption key with the RoT on every other server in the set of servers, wherein the encryption key comprises a quantum key, and wherein a Quantum Key Distribution (QKD) device is used to exchange the quantum key.

10. The method of claim 7, wherein the computing resources shared among the plurality of tenants comprise cloud computing resources and wherein the encryption key is used to encrypt or decrypt one or more data packets exchanged during a memory access.

11. The method of claim 7, further comprising:

updating a number of encryption credits available to the tenant after encrypting a packet with the encryption key.

* * * * *